(12) United States Patent
Christensen et al.

(10) Patent No.: US 10,491,680 B2
(45) Date of Patent: *Nov. 26, 2019

(54) SYSTEMS AND METHODS FOR OUTPUTTING UPDATED MEDIA

(71) Applicant: STRATOSAUDIO, INC., Kirkland, WA (US)

(72) Inventors: Kelly M. Christensen, Kirkland, WA (US); John Phillip Hansen, Austin, TX (US); Thomas Daniel Mock, Sheffield, PA (US)

(73) Assignee: STRATOSAUDIO, INC., Kirkland, WA (US)

(*) Notice: Subject to any disclaimer, the term of this patent is extended or adjusted under 35 U.S.C. 154(b) by 141 days.

This patent is subject to a terminal disclaimer.

(21) Appl. No.: 14/138,524

(22) Filed: Dec. 23, 2013

(65) Prior Publication Data

US 2014/0115105 A1   Apr. 24, 2014

Related U.S. Application Data

(63) Continuation of application No. 13/401,621, filed on Feb. 21, 2012, now Pat. No. 8,635,302, which is a (Continued)

(51) Int. Cl.
*H04L 29/08* (2006.01)
*G06Q 30/02* (2012.01)

(52) U.S. Cl.
CPC ............ *H04L 67/14* (2013.01); *G06Q 30/02* (2013.01); *H04L 67/22* (2013.01); *H04L 67/325* (2013.01)

(58) Field of Classification Search
None
See application file for complete search history.

(56) References Cited

U.S. PATENT DOCUMENTS 4,926,255 A   5/1990   Von Kohorn
5,134,719 A   7/1992   Mankovitz
(Continued)

FOREIGN PATENT DOCUMENTS

CA   2 316 925       7/1999
DE   44 27 046 A1    2/1996
(Continued)

OTHER PUBLICATIONS

PCT/CA96/00794 WO/1997/021291, Jun. 12, 1997, Pocock.
(Continued)

*Primary Examiner* — Scott B Christensen
(74) *Attorney, Agent, or Firm* — Knobbe Martens Olson & Bear LLP

(57) ABSTRACT

In certain embodiments, a device for outputting updated messages a determinate number of times is provided. The device may comprise an output, an input, one or more processors, a memory, code stored in the memory and executed by the processor, wherein at least one message is received from time to time by the device through the input, and wherein the code selects if and when the at least one message is to be provided on the device via the output a determinate number of times. The operation of the enabled device can allow the message to be delivered to the user as the result of some action in regards to enabled device usage.

20 Claims, 5 Drawing Sheets

Related U.S. Application Data continuation of application No. 12/334,411, filed on Dec. 12, 2008, now abandoned.

(60) Provisional application No. 61/013,869, filed on Dec. 14, 2007.

(56) References Cited

U.S. PATENT DOCUMENTS

| | | |
|---|---|---|
| 5,303,393 A | 4/1994 | Noreen et al. |
| 5,438,355 A | 8/1995 | Palmer |
| 5,444,769 A | 8/1995 | Koen et al. |
| 5,539,635 A | 7/1996 | Larson, Jr. |
| 5,548,828 A | 8/1996 | Kozaki et al. |
| 5,557,541 A | 9/1996 | Schulhof et al. |
| 5,579,537 A | 11/1996 | Takahisa |
| 5,661,787 A | 8/1997 | Pocock |
| 5,708,478 A | 1/1998 | Tognazzini |
| 5,752,159 A | 5/1998 | Faust et al. |
| 5,857,156 A | 1/1999 | Anderson |
| 5,872,589 A | 2/1999 | Morales |
| 5,903,617 A | 5/1999 | Kamalski |
| 5,905,865 A | 5/1999 | Palmer et al. |
| 5,907,793 A | 5/1999 | Reams |
| 5,963,264 A | 10/1999 | Jackson |
| 5,991,601 A | 11/1999 | Anderson |
| 5,991,737 A | 11/1999 | Chen |
| 6,018,768 A | 1/2000 | Ullman et al. |
| 6,035,177 A | 3/2000 | Moses et al. |
| 6,036,086 A | 3/2000 | Sizer, II et al. |
| 6,067,107 A | 5/2000 | Travaille |
| 6,098,106 A | 8/2000 | Philyaw et al. |
| 6,202,210 B1 | 3/2001 | Ludtke |
| 6,286,140 B1 | 9/2001 | Ivanyi |
| 6,446,262 B1 | 9/2002 | Malaure et al. |
| 6,463,469 B1 | 10/2002 | Yavitz |
| 6,473,792 B1 | 10/2002 | Yavitz et al. |
| 6,507,727 B1 | 1/2003 | Henrick |
| 6,578,047 B1 | 6/2003 | Deguchi |
| 6,611,201 B1 | 8/2003 | Bishop et al. |
| 6,658,232 B1 | 12/2003 | Johnson |
| 6,701,355 B1 | 3/2004 | Brandt et al. |
| 6,708,335 B1 | 3/2004 | Ozer et al. |
| 6,725,022 B1 | 4/2004 | Clayton et al. |
| 6,771,317 B2 | 8/2004 | Ellis et al. |
| 6,829,486 B2 | 12/2004 | McKenna et al. |
| 6,888,457 B2 | 3/2005 | Wilkinson et al. |
| 6,928,423 B1 | 8/2005 | Yamanaka |
| 6,941,154 B1 | 9/2005 | Ritter |
| 6,957,041 B2 | 10/2005 | Christensen et al. |
| 6,970,886 B1 | 11/2005 | Conwell et al. |
| 6,987,734 B2 | 1/2006 | Hundemer |
| 6,990,312 B1 | 1/2006 | Gioscia et al. |
| 7,010,667 B2 * | 3/2006 | Vorbach et al. ............... 712/10 |
| 7,054,653 B2 | 5/2006 | Järvi et al. |
| 7,088,950 B2 | 8/2006 | Tassberg et al. |
| 7,110,714 B1 | 9/2006 | Kay et al. |
| 7,149,541 B2 | 12/2006 | Rautila |
| 7,158,753 B2 | 1/2007 | Kagan et al. |
| 7,159,232 B1 | 1/2007 | Blackketter et al. |
| 7,190,971 B1 | 3/2007 | Kawamoto |
| 7,194,235 B2 | 3/2007 | Nykanen et al. |
| 7,260,842 B2 | 8/2007 | Hirayama |
| 7,266,343 B1 | 9/2007 | Yli-juuti et al. |
| 7,299,194 B1 | 11/2007 | Manganaris et al. |
| 7,313,359 B2 | 12/2007 | Steelberg et al. |
| 7,313,360 B2 | 12/2007 | Steelberg et al. |
| 7,415,430 B2 | 8/2008 | Christensen et al. |
| 7,415,526 B2 | 8/2008 | Hirayama |
| 7,500,256 B1 | 3/2009 | Ohmae et al. |
| 7,647,609 B2 | 1/2010 | Wachtfogel et al. |
| 7,673,315 B1 * | 3/2010 | Wong ............... H04N 5/44543 386/254 |
| 7,765,574 B1 | 7/2010 | Maybury et al. |
| 7,773,939 B2 | 8/2010 | Christensen et al. |
| 7,788,693 B2 | 8/2010 | Robbins |
| 7,917,130 B1 | 3/2011 | Christensen et al. |
| 8,166,081 B2 | 4/2012 | Christensen et al. |
| 8,200,203 B1 | 6/2012 | Christensen et al. |
| 8,467,724 B2 | 6/2013 | Christensen et al. |
| 8,516,017 B2 | 8/2013 | Christensen et al. |
| 8,589,548 B2 | 11/2013 | Karaoguz et al. |
| 8,631,448 B2 | 1/2014 | Christensen et al. |
| 8,635,302 B2 | 1/2014 | Christensen et al. |
| 8,688,028 B2 | 4/2014 | Christensen et al. |
| 8,903,307 B2 | 12/2014 | Christensen et al. |
| 9,148,292 B2 | 9/2015 | Christensen et al. |
| 9,294,806 B2 | 3/2016 | Christensen et al. |
| 9,325,440 B2 | 4/2016 | Christensen et al. |
| 9,953,344 B2 | 4/2018 | Christensen et al. |
| 9,998,245 B2 | 6/2018 | Christensen et al. |
| 10,148,376 B1 | 12/2018 | Christensen et al. |
| 2001/0001160 A1 | 5/2001 | Shoff et al. |
| 2001/0031013 A1 | 10/2001 | Stetzler et al. |
| 2002/0162118 A1 | 1/2002 | Levy et al. |
| 2002/0026474 A1 | 2/2002 | Wang et al. |
| 2002/0046407 A1 | 4/2002 | Franco |
| 2002/0133824 A1 | 9/2002 | Mensch |
| 2002/0178441 A1 | 11/2002 | Hashimoto |
| 2003/0051252 A1 | 3/2003 | Miyaoku et al. |
| 2003/0077065 A1 | 4/2003 | Scholten et al. |
| 2003/0086694 A1 | 5/2003 | Davidsson |
| 2003/0097338 A1 | 5/2003 | Mankovich et al. |
| 2003/0105809 A1 | 6/2003 | Yoshii et al. |
| 2003/0200543 A1 | 10/2003 | Burns |
| 2003/0208756 A1 | 11/2003 | Macrae et al. |
| 2004/0015704 A1 | 1/2004 | De Schrijver |
| 2004/0205810 A1 | 10/2004 | Matheny et al. |
| 2004/0260682 A1 | 12/2004 | Herley et al. |
| 2004/0268403 A1 | 12/2004 | Krieger et al. |
| 2004/0268407 A1 | 12/2004 | Sparrell et al. |
| 2005/0020223 A1 | 1/2005 | Ellis et al. |
| 2005/0021744 A1 | 1/2005 | Haitsuka |
| 2005/0071223 A1 | 3/2005 | Jain et al. |
| 2005/0166248 A1 | 7/2005 | Blackketter et al. |
| 2006/0075426 A1 | 4/2006 | Koch et al. |
| 2006/0117040 A1 * | 6/2006 | Begeja et al. ............... 707/100 |
| 2006/0141962 A1 | 6/2006 | Forbes et al. |
| 2006/0174261 A1 | 8/2006 | Cline, Jr. et al. |
| 2006/0184960 A1 | 8/2006 | Horton et al. |
| 2006/0212921 A1 | 9/2006 | Carr |
| 2006/0218029 A1 | 9/2006 | Chin |
| 2007/0022437 A1 | 1/2007 | Gerken |
| 2007/0088852 A1 | 4/2007 | Levkovitz |
| 2007/0143777 A1 | 6/2007 | Wang |
| 2007/0156457 A1 | 7/2007 | Brown |
| 2007/0157257 A1 | 7/2007 | Kagan et al. |
| 2007/0198353 A1 | 8/2007 | Behringer et al. |
| 2007/0226146 A1 | 9/2007 | Ruul |
| 2007/0261074 A1 | 11/2007 | Yun |
| 2007/0287456 A1 | 12/2007 | Shimizu |
| 2008/0049704 A1 | 2/2008 | Witteman et al. |
| 2008/0065507 A1 * | 3/2008 | Morrison et al. ............... 705/26 |
| 2008/0086754 A1 * | 4/2008 | Chen et al. ............... 725/105 |
| 2008/0114664 A1 | 5/2008 | Harb |
| 2008/0148320 A1 | 6/2008 | Howcroft |
| 2008/0152039 A1 | 6/2008 | Shah et al. |
| 2008/0155607 A1 | 6/2008 | Klappert |
| 2008/0235746 A1 * | 9/2008 | Peters et al. ............... 725/111 |
| 2008/0263673 A1 | 10/2008 | Brun et al. |
| 2009/0061763 A1 | 3/2009 | Dillon et al. |
| 2009/0104870 A1 | 4/2009 | Christensen et al. |
| 2009/0104872 A1 | 4/2009 | Christensen et al. |
| 2009/0150925 A1 | 6/2009 | Henderson |
| 2009/0177736 A1 | 7/2009 | Christensen et al. |
| 2009/0192916 A1 | 7/2009 | Casper |
| 2009/0205000 A1 | 8/2009 | Christensen et al. |
| 2011/0179453 A1 | 7/2011 | Poniatowski |
| 2013/0076493 A1 | 3/2013 | Christensen et al. |
| 2013/0311278 A1 | 11/2013 | Christensen et al. |
| 2014/0020036 A1 * | 1/2014 | Hasek ............... H04N 7/17309 725/95 |
| 2014/0109152 A1 | 4/2014 | Christensen et al. |
| 2014/0380393 A1 | 12/2014 | Christensen et al. |

(56) References Cited

U.S. PATENT DOCUMENTS

| | | |
|---|---|---|
| 2015/0349904 A1 | 12/2015 | Christensen et al. |
| 2015/0358684 A1 | 12/2015 | Christensen et al. |
| 2016/0165283 A1 | 6/2016 | Christensen et al. |
| 2016/0205159 A1 | 7/2016 | Christensen et al. |
| 2016/0247199 A1 | 8/2016 | Christensen et al. |
| 2017/0155960 A1 | 6/2017 | Christensen et al. |
| 2017/0257657 A1 | 9/2017 | Christensen et al. |
| 2018/0097646 A1 | 4/2018 | Christensen et al. |
| 2018/0365733 A1 | 12/2018 | Christensen et al. |

FOREIGN PATENT DOCUMENTS

| | | |
|---|---|---|
| DE | 196 27 308 A1 | 1/1998 |
| EP | 0 713 335 A2 | 5/1996 |
| EP | 1 742 397 A2 | 1/2007 |
| GB | 2346472 | 8/2000 |
| HK | 1150692 | 1/2012 |
| JP | 07-500715 | 1/1995 |
| JP | 08-139624 | 5/1996 |
| JP | 09-162818 | 6/1997 |
| JP | 09-163346 | 6/1997 |
| JP | 10-135855 | 5/1998 |
| JP | 10-163988 | 6/1998 |
| JP | 10-177532 | 6/1998 |
| JP | 10-257401 | 9/1998 |
| JP | 10-257455 | 9/1998 |
| JP | 2000-115093 | 4/2000 |
| JP | 2000-115094 | 4/2000 |
| JP | 2000-183835 | 6/2000 |
| JP | 2000-196547 | 7/2000 |
| JP | 2000-236306 | 8/2000 |
| JP | 2000292182 A | 10/2000 |
| JP | 2002-504775 | 2/2002 |
| KR | 10-1996-0033096 | 9/1996 |
| KR | 10-1998-0078248 | 11/1998 |
| WO | WO 2000/019662 | 4/2000 |
| WO | WO 2000/078050 | 12/2000 |
| WO | WO 2001/022633 | 3/2001 |
| WO | WO 2001/052541 | 7/2001 |
| WO | WO 2006/122028 | 11/2006 |
| WO | WO 2008/002000 | 1/2008 |

OTHER PUBLICATIONS

PCT/CH99/000006 WO 1999/035771, Jul. 15, 1999, Ritter Swisscom AG.
PCT/FI97/00315 WO 1997/045814, Dec. 4, 1997, Vazvan.
PCT/GB92/000181 WO 1992/014222, Aug. 20, 1992, Tait et al.
PCT/GB93/01526 WO 1994/002909, Feb. 3, 1994, Whinhall Limited.
PCT/GB99/00514 WO 1999/043109, Aug. 26, 1999, TTP Communications Ltd.
PCT/US00/17157 WO 2001/001331, Jan. 4, 2001, Digimarc Corporation.
PCT/US01/02781 WO 2001/057759, Aug. 9, 2001, Minushkin.
PCT/US01/028831 WO 2002/023773, Feb. 21, 2002, StratosAudio, Inc.
PCT/US01/11184 WO 2001/077779, Oct. 18, 2001, Morphics Technology.
PCT/US89/02927 WO 1990/000847, Jan. 25, 1990, Insight Telecast, Inc.
PCT/US97/007485 WO 1997/042724, Nov. 13, 1997, Digital D.J. Inc.
PCT/US98/00040 WO 1999/035809, Jul. 15, 1999, Connexus Corp.
PCT/US98/20725 WO 1999/018518, Apr. 15, 1999, Polash.
"Bookmark Your World", 1999-2000 Xenote, www.xenote.com.
"Sirius to Add 'Instant Buy' Button", Mar. 13, 2000, Twice, V 15, n 7, p. 28.
International Search Report and Written Opinion for Application No. PCT/US2008/086714 dated Aug. 28, 2009.
Jan. 25, 2000, Showcase 2000—Xenote Press Release re Xenote iTage, www.xenote.com/html/press/releases.html.

\* cited by examiner

SYSTEMS AND METHODS FOR OUTPUTTING UPDATED MEDIA

CROSS-REFERENCE TO RELATED APPLICATIONS

This application is a continuation of U.S. patent application Ser. No. 13/401,621, filed Feb. 21, 2012, titled SYSTEMS AND METHODS FOR OUTPUTTING UPDATED MEDIA, which is a continuation of U.S. patent application Ser. No. 12/334,411, filed Dec. 12, 2008, titled SYSTEMS AND METHODS FOR OUTPUTTING UPDATED MEDIA, which claims the benefit under 35 U.S.C. 119(c) to U.S. Provisional Application No. 61/013,869, filed Dec. 14, 2007. Each of the foregoing applications are hereby incorporated by reference herein in their entirety, including specifically but not limited to the systems and methods relating to outputting updated media.

BACKGROUND

Field

The embodiments of the invention relate to the field of interactive media technologies, and in particular, to varying information and/or media outputted before and/or during the start-up and operation of an application and/or device.

Description of the Related Art

The broadcast industry is rapidly changing due to increased competition from new technologies such as satellite radio, WiFi, wireless IP, video sharing websites such as YouTube® and digital media devices. As the universe of options increase for radio and television audiences to obtain media in a digital format for use at a time of their choosing, it has become increasingly difficult for advertisers, underwriters and others to identify a complimentary technology for carrying and delivering their messages in tandem with digital content.

SUMMARY

In certain embodiments, a system for distinguishing user responses in relation to presentation of a media element comprises: a device comprising a plurality of processes; an output module for communicating with a user, wherein the user responds to a specific instance of presentation of the media element; a memory configured to store at least the media element and a unique identifier specific to the instance of distribution of the media element, wherein the memory receives at least the a media element and the unique identifier specific to the instance of distribution of the media element from the server computer via the communications protocol; a processor, the processor configured to perform a first process and a second process, wherein the media element is presented during at least one of the processes; a communications connection configured to communicate with a server computer using at least one communications protocol, wherein a communications algorithm determines a condition for the device to communicate with the server computer over the communications protocol, including communicating to the server computer a response wherein the response comprises at least the unique identifier specific instance of distribution of the media element and data distinguishing the specific instance of presentation of the media element.

In certain embodiments, a system for outputting updated media during certain states of a device comprises: a device comprising a plurality of states; a unique identifier; a communications connection configured to communicate with a server computer using at least one communications protocol; an output module for communicating with a user; a memory configured to store a plurality of media, wherein the memory receives an updated media from the server computer over the communications connection; a processor, the processor configured to perform a first process and a second process; wherein the second process comprises monitoring the plurality of states to detect a transition state; querying the server computer over the communications connection based on a communications algorithm; sending at least the unique identifier to the server computer over the communications connection; receiving into the memory the updated media based on the output of the querying and on the unique identifier, outputting at least one updated media to the output module based on the detection of the transition state.

In certain embodiments, a method of outputting updated media during certain states of a device comprises, in no particular order: performing a first process and a second process, wherein the second process comprises: determining when to communicate with a server computer; querying the server computer based on the output of the determining and on a unique identifier; receiving at least one updated media from the server computer based on the output of the querying; storing the updated media in the device; and outputting to a user the updated media based on when the device transitions between certain states.

In certain embodiments, a method of outputting updated media during certain states of a device comprises, in no particular order: determining when to communicate with a server computer; querying the server computer based on the output of the determining and on a unique identifier; receiving at least one updated media from the server computer based on the output of the querying, wherein the at least one updated media is ancillary to the device's states; storing the updated media in the device; and outputting to a user the updated media when the device transitions between certain states.

In certain embodiments, a device for outputting updated messages during transitions from one mode of operation to another comprises: an output; an input; one or more processors; a memory; a code stored in the memory and executed by the processor; wherein at least one message is received from time to time by the device through the input; and wherein the code selects if and when the at least one message is to be provided on the device via the output whenever the device is transitioning from one mode of operation to another.

In certain embodiments, a message control system for distinguishing user responses in relation to presentation of a media element comprises: a message control module that receives through a communications connection a query from a message device and determines a media element for presentation on the message device, the message device comprising at least a memory, an output, and a processor configured to perform at least a first process and a second process; a database storing a plurality of media elements, wherein the database outputs the requested media element to the message control module; a message delivery module that receives the media element from the message control module and determines a unique identifier specific to the instance of distribution of the media element, wherein at least the media element and the unique identifier specific to the instance of distribution of the media element are sent through the communications connection to the message device for storage in the memory, the message device configured to output the media element during at least one of the processes; and a communication module that receives a response from the message device over the communications connection, wherein the response enables the distinguishing of at least the specific instance of distribution of the media element and the specific instance of a presentation of the media element.

In certain embodiments, a system for distinguishing user responses in relation to presentation of a media element comprises: a device comprising a plurality of processes; an output module for communicating with a user, wherein the user responds to a specific instance of presentation of the media element; a memory configured to store at least the media element and a unique identifier specific to the instance of distribution of the media element, wherein the memory receives at least the media element and the unique identifier specific to the instance of distribution of the media element from the server computer via the communications protocol; a processor, the processor configured to perform a first process and a second process, wherein the media element is presented during at least one of the processes; a communications connection configured to communicate with a server computer using at least one communications protocol, wherein a communications algorithm determines a condition for the device to communicate with the server computer over the communications protocol, including communicating to the server computer a response wherein the response allows the server computer to distinguish at least the specific instance of distribution of the media element and the specific instance of presentation of the media element.

For purposes of this summary, certain aspects, advantages, and novel features of the invention are described herein. It is to be understood that not necessarily all such aspects, advantages, and features may be employed and/or achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

BRIEF DESCRIPTION OF THE DRAWINGS

The foregoing and other features, aspects and advantages of the present invention are described in detail below with reference to the drawings of various embodiments, which are intended to illustrate and not to limit the invention. The drawings comprise the following figures in which.

DETAILED DESCRIPTION OF THE EMBODIMENTS

Figure 1:
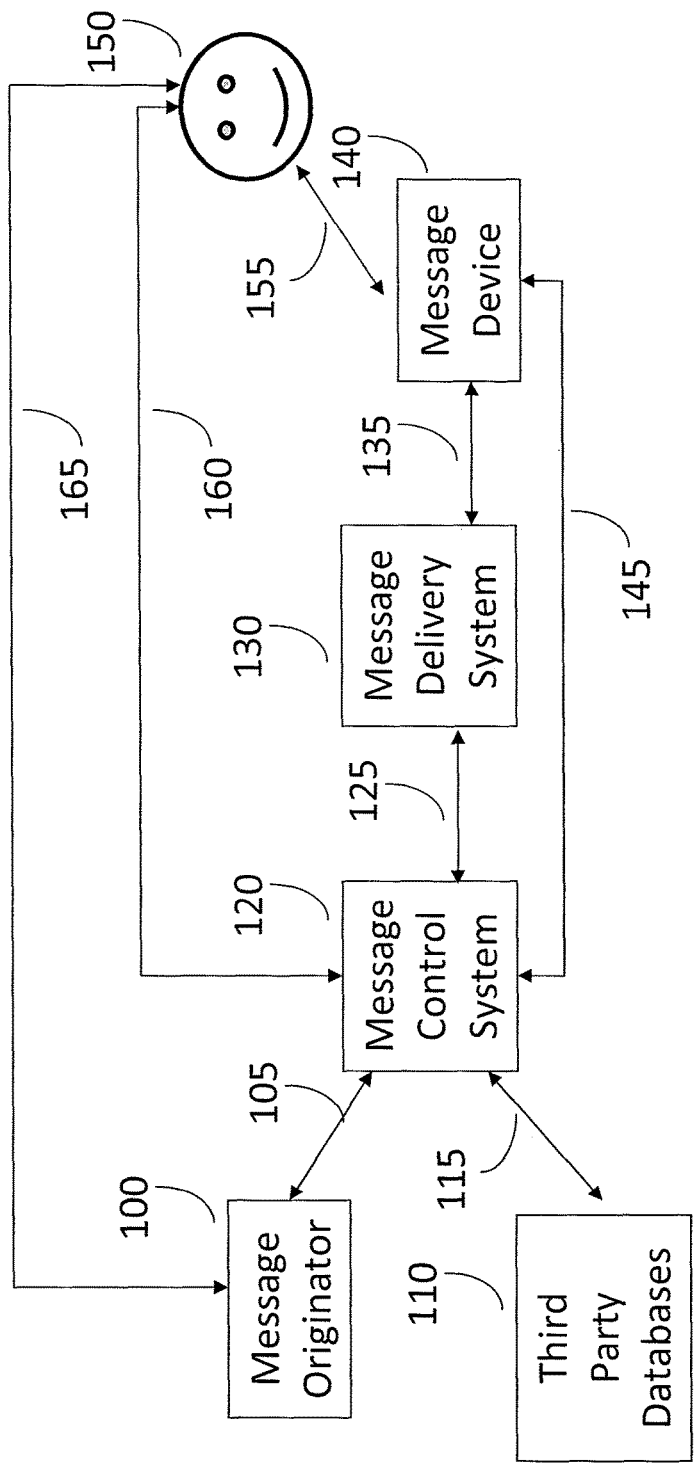
FIG. 1 illustrates a block diagram of an embodiment of the system architecture of the media element presentation system.

Although several embodiments, examples and illustrations are disclosed below, it will be understood by those of ordinary skill in the art that the invention described herein extends beyond the specifically disclosed embodiments, examples and illustrations and includes other uses of the invention and obvious modifications and equivalents thereof. Embodiments of the invention are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the invention. In addition, embodiments of the invention can comprise several novel features and no single feature is solely responsible for its desirable attributes or is essential to practicing the inventions herein described. Numerous technical details are set forth in this description. These details are provided to illustrate various embodiments, and are not intended to limit the inventions. Thus, nothing in this detailed description is intended to imply that any particular feature, characteristic, or component of the disclosed system is essential to the inventions.

The terms "message element," or "media element," or "data stream" as used herein are interchangeable and the terms broadly refer to, without limitation, content, data, advertisements, reports, events, items, and/or programming comprising graphical, textual, video and/or audio elements distributed over a wide variety of media such as terrestrial radio, over-the-air (or terrestrial) television, cable, satellite, internet, Wi-Fi, Bluetooth, cellular networks, peer-to-peer networks, LAN's, WAN's, or the like.

The terms "computer server," or "computing systems," or "computer clients," or "servers," or "computing system devices," as used herein are interchangeable terms, and the terms broadly refer, without limitation, to a machine that manipulates data according to a list of instructions, or the like.

There has long been a desire to enable variable message transport to electronic device users, particularly when the device is initially turned on, there has been a change in settings, and/or a wait state occurs. Messages can be expressed in a variety of ways, such as audio and/or visual presentation. Some examples of these message types are theatrical trailers in movie theatres, television promos, DVD and/or video promos, start up screens on mobile phones, digital media devices, computer start up screens and/or game start up screens, software start up screens, the idle screens of information kiosks in malls and/or arcade games and/or displays at cash registers and/or gas pumps. Devices and/or service systems, for example, websites and/or applications, can be designed to capture the user's attention and/or deliver a message while the user's attention is "captive" during a phase of operation where the primary use of the device has not yet begun.

The devices delivering these messages may be divided into several categories. The first category comprises systems where a message and/or messages are included prior to distribution and/or in resident software. Examples may comprise computer boot-up displays where in most cases, a static message is presented, mobile phone displays (also static), car radios and/or idle screens for an arcade game and/or games consoles. For these message types, the message can be static in nature. The amount of time that the message is displayed can be set with a default value at the source of origin when the device and/or software is produced and/or initially distributed. In some cases, the default display time may be affected by interruption, such as when a user instigates an action. The messages tend to provide brand name reinforcement, usually in the form of a logo, and/or as inducements to try the device.

Another category is removable media. An example of this category is a DVD and/or some DVD players that can show brand logos at power up and/or theatrical trailers for available and/or future attractions upon use of the DVD media. These messages are unique to the release of the DVD and/or any dated-ness of the message tends not to be a severe hindrance. For example, if a DVD's theatrical trailer promotes a "coming attraction to a theater near you", the message description regarding distribution of the movie may be outdated, but if the message motivates the user to locate the appropriate medium for rental and/or purchase, such as a DVD for the coming attraction, the message is generally considered to be successful. In this example method, the message can be embedded on non-rewriteable media and is thus not generally changeable. Messages bound to particular media, such a rental DVD's and videotapes, can generally be viewed if and/or when users obtain and view the media. The decision of which media is to be obtained and viewed is generally controlled by the consumer, and since users can fast forward and/or even skip introductory messages, a certain randomness is present regarding which message will be received by the consumer.

Another category comprises updateable messages, which can be updated by a fixed wire connection and/or through the use of a local wireless connection and/or local serial connection. An example of this category is a display on a gasoline pump that alternates between welcome messages, instructions on device usage and/or promotional messages. The message and/or the message timing are easily changed. One disadvantage is that users tend to be focused on something other than the delivery device and/or thus the message is either ignored, lost in background noise and/or not received due to the fixed nature of the delivery device and/or the mobile nature of the intended recipient.

Another category comprises a service for receiving and/or presenting an advertisement to a user on a computer. In this category, an example of use may comprise a circumstance where the user obtains a free service in exchange for viewing an ad and/or series of ads where those ads are presented based on a predetermined system of prioritization and/or other prioritization scheme. In this category mobility is generally limited and the nature of presenting the message to the recipient is generally aggressive. A number of services of this nature may require that a sponsor's message be present in a prominent place and in a size such that users could not ignore that message. In addition, a message is generally presented during use of the free service by the end user. As consumers expect to take more of their personal electronic universe with them, the fixed wire method of updating the message works for those nodes the consumer may visit (for example, a gas pump), but do not travel with the consumer upon completing use.

A J2ME and/or Java application can be written and/or compiled for use on a mobile telephone device and/or digital media device. Since J2ME applications can take time to load, either by design or otherwise, a graphical presentation of a message during load time can be built into the operation of the J2ME application resident on the receiving device. The message presentation can be graphical in nature, last for a few seconds and/or can be replaced by the user interface when the application completes the loading process. Since the application can be designed to run on a device that can be capable of sending and/or receiving digital information, the messages slated for presentation can be updated from time to time, by a database server.

In some embodiments, the database server can receive, store, and/or transmit message elements, including graphical, textual, video and/or audio elements. Each message element, also called a media element, can have an assigned unique identifier, which can also be stored in the database server. The database server can feature a conditional access user interface that allows programmable filters and/or conditions to be applied to the control, transmission, presentation and/or response to message elements. In some embodiments, frequency of message element presentation, duration of message element presentation, conditions of response to message element presentation, language and/or the general realm of potentialities relating to the control of message elements can be controlled by conditions set in the database server. In some embodiments, peer to peer networking can allow the passage of message elements from user to user. In other circumstances, a user device can present an additional and/or supplementary message element in addition to those that can be set by conditions present in the database server. Conditional filters in the database server can comprise: geographic location, time of day, language, source of broadcast transmission, cost of message element presentation, cost of reporting frequency of message elements presentation, number of times message element presentation occurred, responses generated from message element presentation, demographic information associated with message element presentation and response, reporting results of message element presentation and response, and/or the like.

An example of a system for outputting updated media during certain states of a device is provided. The system may comprise a device, the device including a plurality of states. The system may further comprise a unique identifier, a communications connection configured to communicate with a server computer using at least one communications protocol, an output module for communicating with a user, a memory configured to store a plurality of media, wherein the memory receives over the communications connection an updated media from the server computer, and a processor, the processor configured to perform a first process and a second process. The second process may comprise monitoring the plurality of states to detect a transition state, querying the server computer over the communications connection based on a communications algorithm, sending at least the unique identifier to the server computer over the communications connection, receiving into the memory the updated media based on the output of the querying and on the unique identifier, outputting at least one updated media to the output module based on the detection of the transition state.

In certain embodiments, a method of outputting updated media during certain states of a device is provided. The method may comprise performing a first process and a second process. The second process may comprise determining when to communicate with a server computer, querying the server computer based on the output of the determining and on a unique identifier, receiving at least one updated media from the server computer based on the output of the querying, storing the updated media in the device, and outputting to a user the updated media based on when the device transitions between certain states.

In one example, a method of outputting updated media during certain states of a device is provided. The method may comprise determining when to communicate with a server computer, querying the server computer based on the output of the determining and on a unique identifier, receiving at least one updated media from the server computer based on the output of the querying, wherein the at least one updated media is ancillary to the device's states, storing the updated media in the device, and outputting to a user the updated media when the device transitions between certain states.

In some embodiments, a device for outputting updated messages during transitions from one mode of operation to another is provided. The device may comprise an output, an input, one or more processors, a memory, and a code stored in the memory and executed by the processor, wherein at least one message is received from time to time by the device through the input, and wherein the code selects if and when the at least one message is to be provided on the device via the output whenever the device is transitioning from one mode of operation to another.

An embodiment can comprise a method of outputting updated information during certain states of a device. The method may comprise broadcasting information for delayed presentation on a device, and presenting the information when the device transitions from one state to another state.

In certain embodiments, a device for outputting updated messages a determinate number of times is provided. The device may comprise an output, an input, one or more processors, a memory, a code stored in the memory and executed by the processor, wherein at least one message is received from time to time by the device through the input, and wherein the code selects if and when the at least one message is to be provided on the device via the output a determinate number of times.

One such system can use electronic devices to present variable messages at specific points of operation and/or at the same time to retain the mobility and/or practicality of delivering variable messages to enabled devices. Another such system can control message frequency, location, size, duration, and/or geographic location where presentation may occur to increase the relevancy of the message. For example, in some embodiments, message frequency can comprise delivery filters such as: presentation of the message a definitive number of times, over a controlled period of time, and/or on specific devices in certain geographic locations. In some embodiments, the system can enhance the efficiency between the retention effectiveness of repetition and the attention gathering capability of novelty.

As another example, the system can comprise a first database server device or cluster of first database servers or a combination of first database servers and at least a second device to provide message control and delivery to second devices. System source and control diversity can increase the ability of the system to create messages with both broad and/or focused targeting. An example of focused targeting can comprise the use of peer to peer relationships.

The system can achieve these goals by employing a combination of some or all of the following methodologies and/or other methodologies not disclosed herein. In some embodiments, messages or parts of messages can be stored in the device prior to distribution. This can provide an inexpensive solution for storing messages in the device and can offer a very good method for storing brand logo's that may tend not to change much over the life of most electronic devices.

New graphics, text and audio used independently or in any combination to form new messages, addendums and secondary messages can be updated by the system in the enabled device remotely through using a wireless link. In some cases, the enabled device can be updated when the device may be temporarily docked, including, for example, when a digital media player may be docked to download new media and/or synchronize with a computer, including when images, audio and/or video may be acquired.

Enabled devices can comprise for example: mobile phones, a computer connected to the Internet, a car radio with wireless connectivity to a network, a device supporting removable media (such as a game cartridge, memory stick and/or disc), appliances with network access, GPS systems, display and audio systems in a bar in a restaurant and/or tavern, digital media devices and/or any other device supporting the receipt and presentation of information from a discreet source. The system and methods can allow messages to be updated periodically, whether on a set schedule, in a random manner and/or in contextual association with programming based on a user's demographic profile, location, behaviors, an enabled device's characteristics and/or usage patterns, a message provider's preference and/or user preferences to keep the contents of the message current, and/or as one user provides an update to a second user through a peer to peer network.

In certain cases, messages, images, portions of images, textual information, and/or audio information, can be embedded in a data stream and/or combined for delivery to enabled devices. Encryption and compression technologies can also be employed for additional security and/or capacity. The images, portions of images, and/or the messages can be reconstructed in the enabled device by software designed for this purpose.

The system and methods can be applied to a variety of devices. The form of output can be presented using any of the senses, including visual and/or aural. System variety can enable an ability such that the messages formed can be a combination of generic images (for example, a picture of an unbranded sample product like a computer or shoe), a corporate logo, a graphic image conveying an idea, generic and/or specific text, music, speech, video, and/or the like. In some circumstances, devices can comprise: game players, mobile phones, TV's, pagers, automobile dashboards and/or automotive radio displays, DVD's and/or CD players, computers, digital cameras, alarm clocks, radios, PDAs, digital media players, and/or the like. Device information can be presented using: devices that use removable media (for example, a portable game player that uses game cartridges and/or a DVD using a disc), devices that operate using a wireless network (such as a mobile phone, 802.xx and/or WIFI devices, Bluetooth enabled devices, Satellite radios, AM, FM and/or digital radios), and/or devices that are periodically docked (such as a portable digital media player and/or digital camera). In some conditions, the devices can have aspects of one, two, or all three of the aforementioned categories. The general operation can remain the same, or the method of updating all or part of the messages can vary.

The operation of the enabled device can allow the message to be delivered to the user as the result of some action in regards to enabled device usage. Selective delivery can be activated upon enabled device power up, by coming out of a low power "sleep" mode, by going into or out of an idle mode, when a new mode is selected, when new media is presented to the device (including by docking, inserting removable media and/or wireless delivery), when the enabled device is waiting for new media (by the same methods of docking, inserting removable media and/or wireless delivery), when a new channel is selected by the user, using an incremental and/or iterative measurement process monitored by internal software and/or by a database server on a network, starting a new application during some aspect of operation, which can be triggered by an alarm set within the device, and/or an alarm transmitted to the device and/or when it is believed it would be the optimum time to deliver the message to the user.

An option can also be presented to the user to select the frequency of presentation; type of message; message category; and/or program opt-in and/or opt-out for messages that provide a call to action with a premium benefit for participation either through direct use of the device, through use of the Internet, through preferences that are set when the device is first used, and/or at the retail location the device was purchased. Delivery of the message can be made when the device would otherwise be idle, engaging in procedures other than the device's primary function, including when the device is charging, booting up, and/or when presentation of a message would not interfere with the device and/or application's primary function. Whether the wait would be increased to allow time for new message information to be received, or just replace an existing or neutral display can depend on the application, campaign rules in the case of advertising, and/or consumer acceptance of the message.

Devices that take longer for charging, booting up, and/or to come out of the idle state can have a longer duration of displaying the message. Consumers can have the option to instigate a follow up to a message presented to obtain more information; partake in an offer; select a graphic image presented in the message as a background screen on, for example, a mobile phone, digital media player, game device, and/or car radio; select an audio file presented in the message as a ringtone and/or an alarm on, for example, a mobile phone; and/or otherwise interact with the message sender.

The system can allow associative rewarding for use, for example, the system can ascertain the capabilities of enabled devices and/or offer premiums based on the capabilities of presentation of the device and/or acceptance of the messages by the user. Examples of when to offer a reward for use in a gaming system can be: game pause time; a win, loss, and/or end of a game; boot up, and/or shut down. The occurrence of these events can be a good time to advertise a new game and/or game module. For example, if a person plays to a certain game level, the enabled device can then offer the chance to try a module that did not ship with the game. If the user attains the new level, the user can acquire the next level module. An advertiser can offer hints to game users with the ability to win a premium for completing review of the advertiser message such as watching a video and/or listening to an audio stream.

In certain embodiments, the premium program can tie an award for any portion of the premium to answering questions related to the message as a mechanism for validating message receipt, consumer reaction to the message, and/or consumer follow up to the message. Messages to users can be tailored through the use of an interest list generated by the user and/or through observing selections made by the user and/or compiling associated opportunities. The interest list may reside in a variety of places including: on the enabled device, on a separate device, in a database, on the web, in messages distributed in portion to users in a broadcast where pairing of the message portions in a peer to peer environment can facilitate completion of the message, and/or a message accessed at a retail kiosk where the message is tailored to the user. Additional applications of use can comprise in a retail environment where the product map created incentivizes consumers to visit retail outlets when enough points have been accumulated to redeem items offered within the retail program.

Fulfillment options for a point system can be based on the mapped interest list created by a user and/or by presenting categorical and/or accumulated points associated with points acquired. Messages to the user can also be focused on particular subjects based on, for example, previous response patterns to other messages by the user and/or by the demographic within which the user resides. This methodology can allow for messages tailored to user preference. For some consumers, having the device "entertain" them with a non-static message during an otherwise enforced idle time can be considered a positive thing, especially in circumstances where interaction with the message can be enabled and/or where, in some cases, that interaction can provide incentives in the form of premiums, for participation.

Users that find a message interesting can also forward the message to another user with a personal message. In certain embodiments, a radio and/or an enabled device featuring a radio as one component with Radio Data System (RDS) and/or wireless Internet Protocol, a display screen, memory and/or one or more processors can be used. The processors can be capable of processing data received over the RDS and/or wireless IP link from the RDS demodulator and/or baseband chip, examining the data received, and/or storing the data in the memory. Further, the processor can be capable of retrieving data from the memory and/or outputting it to the display screen and/or through the audio processing system or both. The enabled device, and/or removable memory shipped with the enabled device can have various content, including images, text, and/or audio installed prior to delivery and/or first use by the end user. This content can comprise logos of companies (for example of an auto manufacturer), still images (such as a sign advertising for a "Big Sale"), moving images (such as a series of images showing a car driving across the display), text (such as a slogan mark for a company), and/or audio themes.

In certain embodiments, tuning to a station, RDS, WiFi and/or wireless IP can enable delivery of information associated with broadcast segments on a radio and/or video channel and/or update messages (such as text, graphics and/or audio describing the cost and availability of a new model of car) to an enabled device. The updated messages can be similar to those installed prior to distribution of the enabled device as described above. In some cases, no message components may ship with the device. In others, all or some message elements can be conveyed to the device through transmission and/or through a direct connection to the device during a sync operation. The aforementioned embodiments can be expressed through the use of additional elements as in the case of a digital media player connecting to a computer and/or can be expressed in the use of various components, while remaining substantially the same.

The device can be any electronic device that supports user interaction. The functions performed by the data broadcast can be supported by many methods of transmitting data including, for example: RDS, RBDS, television, DARC, digital radio, satellite radio, internet delivered over a wired network, data delivered over power lines, and/or wireless methodologies such as WIFI, Bluetooth, GPRS, EVDO, 3G, EDGE, WiMax, and/or UMTS. In some embodiments, data delivery can also be performed using removable media such as a disc, cartridge, a USB drive and a variety of memory sticks. The display screen can be augmented and/or replaced by a variety of presentation methods for communication to the user. The presentation means can comprise: visual, aural, tactile, olfactory, taste and/or a combination thereof. There can be a combination of presentation means. In some embodiments, the memory and/or one or more processors can be part of any electronic device, including hard-wired dedicated electronics, and/or general-purpose electronics that can depend on software to determine their use or a combination.

In some embodiments, the initial triggering action for the message can occur when the radio device and/or software controlling the radio device may be powered up and/or activated. There can be a delay between when the radio may be powered up, the software may be activated, and/or the decoding of new data being obtained via the data channel. Messages can be presented at any time regardless of the time involved in transferring new message data. Messages can comprise of information installed prior to physical distribution of supporting devices, information installed upon initial use, information installed when used by a new user and/or a user ID is sensed, and/or may consist of information updated during use. Message information transport can involve a process with elements of all or a portion of the previously mentioned methods. A combination of information installed before device distribution and message information updated during use can be employed.

In certain embodiments, on power up the processor can begin the program routines to initiate operation of the enabled electronic device such as a radio and begin tuning to a channel in order to receive data from the data channel. The processor can select a message installed prior to distribution for display from the memory (for example an automobile maker's logo), can output the resident message on the radio's display, can pause momentarily while the information is displayed, can update the radio display with a new message (for example, inviting customers to come see the recently arrived new cars at the address of a local dealer), and/or can pause momentarily while the updated message information is presented.

Upon power up of the device, a resident application can reference logic where details regarding the latest message information such as a graphic of a logo and/or similar image and/or textual information may be stored. Rules of presentation can also be resident to determine the number of presentations in one expression and the time frame for the beginning and end of a campaign for presentation of the stored information in another expression. A counter can also be employed where once the information may have been presented for a certain number of times the application can reset the count, and can allow a new message that was downloaded in the background to be presented. In some embodiments, once the programmed message has been presented, the radio can switch to displaying the information related to the broadcast coming over the data channel (for example, the artist and title of the song being played).

The order of the program routines can allow for starting up the enabled device and then displaying the message or the converse where the device displays the message and then starts up the device. A combination of the two routines by the system can also be done. The order in which the routines are performed can be ordered to minimize the amount of time elapsing from instigating power up to full operation of the device.

A variety of parameters can affect the priority of the presentation routines such as: processing power, data channel transmission rates, size of the message, and/or user interest input. Message prioritization can be determined using a variety of criteria. For example, the message can be specific to a geographic location. In some embodiments, powering on the enabled device and/or application in a particular location can present a message tailored to that location. Another embodiment can comprise presenting a recently received message and/or a weighting factor included with the updated message.

Message presentation can be randomized. For example, message presentation can be determined based on observing aggregated user response data and/or user preferences. A counter can be used to control the number of times a message is presented. A beginning and end date for presentation of the message can be used by advertisers and/or underwriters for specific campaigns. Language and/or culture affinity can determine the message type for display, allowing a variety of languages and/or cultural messages to be presented in any geographic location.

Storage of message information can be associated by geographic location, time and/or date, first in first out, weighting factors, user data and/or preferences, message size, message date, program end date, comparison with information regarding when to start and/or stop display of the updated message, a randomly determined counter controlling the number of times the message has been presented, commands received by the device, language, culture and/or observation of aggregated user activity. In some situations, in the absence of fulfillment of presentation criteria, no message may be displayed, and/or a message composed from the messages installed prior to distribution may be presented.

An example of the operation using a removable media could be the case of a portable game player that has a display, a processor, memory and uses removable media such as a game cartridge. In the game cartridge, the updated messages can be downloaded into the portable game player. The portable game player can display the updated messages on power up, power down and/or when the game is idle. The selection of which message is stored and which message is displayed from all the potential messages received by the portable game player when different game cartridges are used can be determined using criteria determined by the manufacturer of the game, the distributor of the device, the store where the device was purchased, by a third party company whose software controls the operation of the game and/or media presentation, and/or by selection by the user. A combination of these factors weighted by intelligent design can also be employed.

An example of system operation may be demonstrated by a digital media player using periodic docking. In this example, when the digital media player is docked for updating content, updated messages could also be downloaded. The selection, storage, and/or display of the messages can be operated in a manner similar to that described above.

A variety of electronic devices supporting any means of receiving data from another source, data channels, broadcast methodologies, presentation tools and procedures such as J2ME, BREW, WIPI, wired and/or wireless protocols such as EVDO, GPRS, WiFi (802.xx), HTTP, TCPIP, USB, Firewire, BPL, and/or database technologies either locally resident and/or distributed may be used by the system. The system can also provide numerous means of communicating to the user including: aural, olfactory, tactile, and/or visual.

The enabled electronic device can have a variety of operational states that the device can cycle through. A non-exhaustive list of such states may be idle, off, start up initialization, awaiting user entry, primary purpose of the device, power save, changing from a primary purpose to a secondary purpose, and/or the like. In some embodiments, when the device is transitioning between the states, it may be appropriate to display information to the user. For example, while the device may be going from an off state through the start up initialization state and preparing to execute the primary purpose of the device state, a display of information can be made between the states and/or during a state that may not require the output capability.

The electronic device can have an identifier. A database can store the device output, storage, communication capabilities, and/or other pertinent information about the device. Retrieval of the information from the database can be affected by using the identifier. The identifier can be associated with a class of devices, such as a particular model. The identifier can also be associated with groups of classes of devices, such as a particular model sold through a particular channel, operating in a particular geographic area, and/or being used by a particular demographic of people. The identifier can be individual to the enabled device, and can allow for the identifier to identify the capabilities of the device and/or the registered owner of the device.

The identifier can also consist of multiple layers of identifiers, such as, for example, a model identifier, a group identifier and/or an individual identifier. For example, as the information on the device is acquired, the identifier can be populated. The identifier can also indicate the capabilities associated with the service subscribed to for the device. For example, a cell phone can have a model identifier from the manufacturer installed at manufacture, a group identifier associated with the cell phone carrier when the cell phone is activated on that carrier's network, and/or an individual identifier for the person registered to the cell phone. These identifiers can be inputted together or separately.

The degree of uniqueness of the identifier, in other words how complete the information is about the model and the user, can be variable, with some devices having more unique information than others. The back end server system can know the type of output supported by each device and depending on the amount of information in the unique identification, the type of output that may be most appropriate for the user of the enabled device.

The device can have a communication connection that may allow for information to be received by the enabled device. The communication connection can also have the capability of transmitting from the device. Communication to the enabled device to update the media to be outputted can be accomplished by transmitting the data and/or the unique identifier to the enabled device.

If the device has the capability of transmitting, then the enabled device can transmit the unique identifier to a server. The server can then transmit the media to be outputted to the enabled device. There are many ways in which the timing for the device to transmit to the server can be determined. For example, the transmission can be when the device is established on a communication protocol, periodically, based on a date inputted into the device, based on the number of times the media has been outputted, when the device status changes, and/or any combination of the above and/or other criteria.

The enabled device can have an output module capable of communicating with the user of the enabled device. This output module may be a display, speakers, tactile feedback and/or other means of communicating with the user. The device can also have memory for storing the media to be outputted. The nature of the output, the memory for storage, and/or the media can be coordinated in whatever format the media may be used. Compression and/or expansion algorithms for communicating the media, storing the media, and/or outputting the media can also be used.

The device can also have a processor for coordinating the communication connection, output capability, and/or memory for storage and/or for processing the various states. The processor can have multiple processes running to handle these elements of the enabled device. For example, one of the processes running may have several sub-processes operating associated with the media output. The functions of these sub-processes can comprise identifying the state the device is in and/or the transition between states. In another example, this "state" identification can be used to determine when the media should be outputted. Another sub-process can handle the communication connection, including connecting to the server at the appropriate time and/or in the appropriate manner, querying the server for updated media by sending the device's unique identifier, and/or receiving updated media for storage in the device's memory. When and how it is appropriate to communicate to the server can also be updated when the device communicates with the server.

There can also be a sub-process that collects information about the enabled device usage, including but not limited to the media outputted by the device. This information can be communicated to the server along with the identification, in some circumstances, to provide information to determine what media should be assigned to the device and/or to provide data for reports on the usage of the device and/or statistics about the media outputted. Under certain circumstances, the enabled device, database, server, communication connection, and/or the like can be combined into a single system or distributed across multiple systems.

In some embodiments, the database server controlling the distribution of messages can assign a unique identifier specific to the instance of broadcast and/or distribution that could be used in, for example, a peer to peer network of each message such that receipt, response to, and/or forwarding of messages can be tracked in a database designed for such purposes. Message distribution can be tracked using the unique identifier specific to each instance of distribution, and/or where that unique identifier specific to the instance of distribution can be stored in a server computer, even in cases where the same message is repeated in multiplicity; the ability to ascertain the success of message receipt and impact can be greatly enhanced since comparative studies and reporting can demonstrate differences in user interest based on multiple distributions and presentations of the same message.

In certain embodiments, the unique identifier specific to each instance of distribution, also called the unique event identifier, can be used to track the effectiveness of a specific distribution of a message element. The unique event identifier can distinguish between multiple distributions of the same message element, allowing better tracking of the effectiveness of a distribution. The response rate for a particular distribution can be tracked using the unique event identifier. For example, an advertisement for a restaurant could be determined to be more effective right before lunchtime and/or dinner time while an advertisement for a sale could be determined to be more effective after work hours. In some embodiments, the unique event identifier can be stored with a device's and/or user's identification to allow tracking the particular response of a specific user. Tracking both identifiers can allow the determination of when a particular user and/or demographic of users is most receptive to a specific message element.

In certain embodiments, a unique identifier specific to each instance of presentation can be used to track the effectiveness of a specific presentation of a message element on a message device. The message device with storage can store a message element for future presentation. The message device can assign a unique identifier specific to each instance of presentation to each presentation of the message element. Using a unique identifier specific to each instance of presentation can allow particular presentations to be distinguished so that the ability to ascertain the success of message receipt and/or impact can be greatly enhanced since comparative studies and/or reporting can demonstrate differences in user interest based on multiple presentations of the same message. In one embodiment, the unique identifier specific to each instance of presentation can be associated with a count of the number of times a message element has been presented. Information such as the number of presentations required before a user responds and/or the diminishing effectiveness of previously presented message elements can be tracked using the unique identifier specific to each instance of presentation. In certain embodiments, the unique identifier specific to each instance of presentation can be associated with a GPS location provided by the message device, allowing further tracking of the effectiveness of a message element based on a user's location. For example, a user at a mall may be found to be more receptive to sales advertisements. Once a user response with their location information is received, additional message elements can be sent responsive to the location. For example, a user at a mall responding to an advertisement to a sale at one store in the mall can receive additional advertisements to other stores in the mall.

Additional embodiments, some related to the use of the unique identifier or unique event identifier, are disclosed in U.S. patent application Ser. No. 10/806,084, filed Mar. 22, 2004, titled "BROADCAST RESPONSE METHOD AND SYSTEM", which is attached hereto as Appendix A and is made a part hereof, and is incorporated herein by reference in its entirety.

FIG. 1 illustrates an example of the system. The message originator 100 can be the entity desiring the message to be delivered. This can be a web interface allowing the selection of which devices 140 can receive the message, the determination of the duration the messages can be delivered in terms of number of impressions or passage of time and uploading the message content. The message originator 100 can communicate with the message control system 120 using communication link 105. The communication link 105 can be one-way from the message originator 100 to the message control system 120 or can have a return information path. The communication link 105 may use a single or multiple methods for both transmitting from the message originator 100 to the message control system 120 and transmitting from the message control system 120 back to the message originator 100. An example of a return message from message control system 120 to message originator 100 could be a report detailing the delivery of messages. Message originator 100 is shown as a single entity in FIG. 1, but can be multiple entities with the same or different characteristics.

The message control system 120 may communicate with third party databases 110 using communication link 115 to prepare messages for delivery, to asses message delivery system 130 options such as radio station formats, message device 140 characteristics such as screen size and/or any other information required by the system. The message control system 120 can send the prepared message to message delivery system 130 using communication link 125. The message control system 120 can store the information about the message devices 140 and their users 150; message delivery systems 130; past, present and future messages and their results; and other information needed to successfully complete the message delivery cycle. Message delivery system 130 is shown as a single entity, but can be multiple entities with the same or different characteristics. For example, message delivery system 130 may be duplicated for different geographic regions and/or for access to different message devices 140 using different message delivery systems 130. Likewise, third party databases 110 may be multiple systems. Communication link 125 may be multiple different communication methods that can be unidirectional or bidirectional.

Message delivery system 130 takes the message to be delivered to the message devices 140 and communicates them to the message devices 140 using the communication link 135. Three non-exclusive examples of message delivery systems can be a satellite radio system, a terrestrial radio system, GPS, and/or a cellular/wireless phone system. These could operate independently of each other or in conjunction with each other. The nature of the communication link 135 can depend on the nature of the message delivery system 130 and the message devices 140. For example, a satellite radio system may have a unidirectional communication link 135 from message delivery system 130 to message devices 140 while a cellular phone system may be bidirectional. The communication protocols used can also be dependent on the nature of the message delivery system 130, messages devices 140 and communication link 135.

The message device 140 is shown as a single entity, but can be multiple message devices 140 with the same or different characteristics. The message device 140 can deliver the message to the user 150 using the user interface 155. The message devices 140 can have one or more methods 155 for delivering the message to the user 150 such as displays and/or speakers. A user 150 may interact with more than one message device 140. The message device 140 may be able to store one or more messages for delivery to the user 150. The message device 140 may communicate back each delivery of a message, a summary over time of delivery of messages and/or a report when a goal has been reached or failed to be reached after a certain amount of time and/or whatever message delivery reporting desired. Alternatively, the communication from the message control system 120 through the message delivery system 130 to the message device 140 can be one way with no return communication path for message delivery reporting. The communication from the message device 140 can be through the message delivery system 130 using communication link 135 and/or to the message control system 120 through communication link 145. An example of communication link 145 could be the internet when message device 140 is docked to a personal computer.

The user 150 receives the message from the message device 140 using user interface 155. The user can communicate back to the message device 140 which in turn may communicate back to the message delivery system 130 using communication link 135 and/or message control system 120 using communication link 145. Alternatively, the user may communicate back directly to the message originator for example by calling a phone number and/or visiting a web site that was part of the message using communication link 165 and/or communicate to the message control system 120 using communication link 160. An example of communication to the message control system 120 can be to update demographic information about the user 150 and/or in response to a message.

Figure 2:
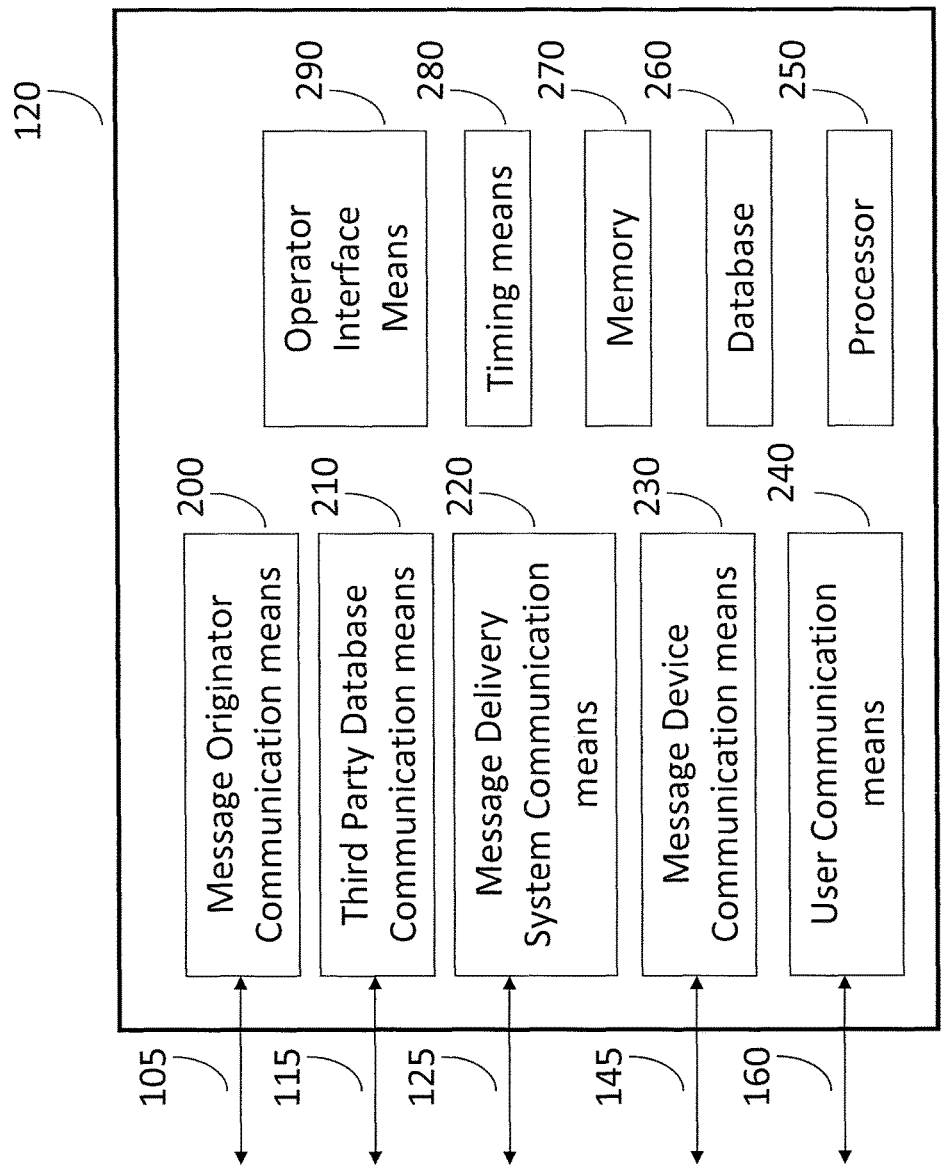
FIG. 2 illustrates a block diagram of an embodiment of the message control system of FIG. 1.

FIG. 2 illustrates an example message control system. The communication links 105, 115, 125, 145 and 160 are as illustrated from FIG. 1. The presence or absence of elements of the system, such as third party data base 110 can determine the presence or absence of the corresponding communication link and communication means. The nature of the communication means 200, 210, 220, 230, and 240 can depend on the nature of the corresponding communication links. The communication means may be self contained and/or use processor 250 and/or memory 270. The memory 270 can contain the program and data needed to operate the message control system 120. The processor 250 can comprise special purpose circuitry such as encryption. The database 260 can store the unique identifiers and associated message information so that when a unique identifier is returned, the unique identifier can be used as a key into the database allowing for retrieval and transmission of the correct message information. The timing means 280 allows for a check to be made if a new message needs to be sent to the message device 140. The operator interface means 290 allows for input into the message control system 120 and for output, such as reports to be generated. By tracking the unique identifiers being sent from and returned to the message control system 120, the efficacy and popularity of messaging campaigns can be determined. The unique identifiers associated with the message can be determined in the message control system 120. The determination can be accomplished by generation of the unique identifiers using the processor 250, program code stored in the memory 270 and/or the database 260 and/or by means external to the message control system 120 such as through the third party database 110.

Figure 3:
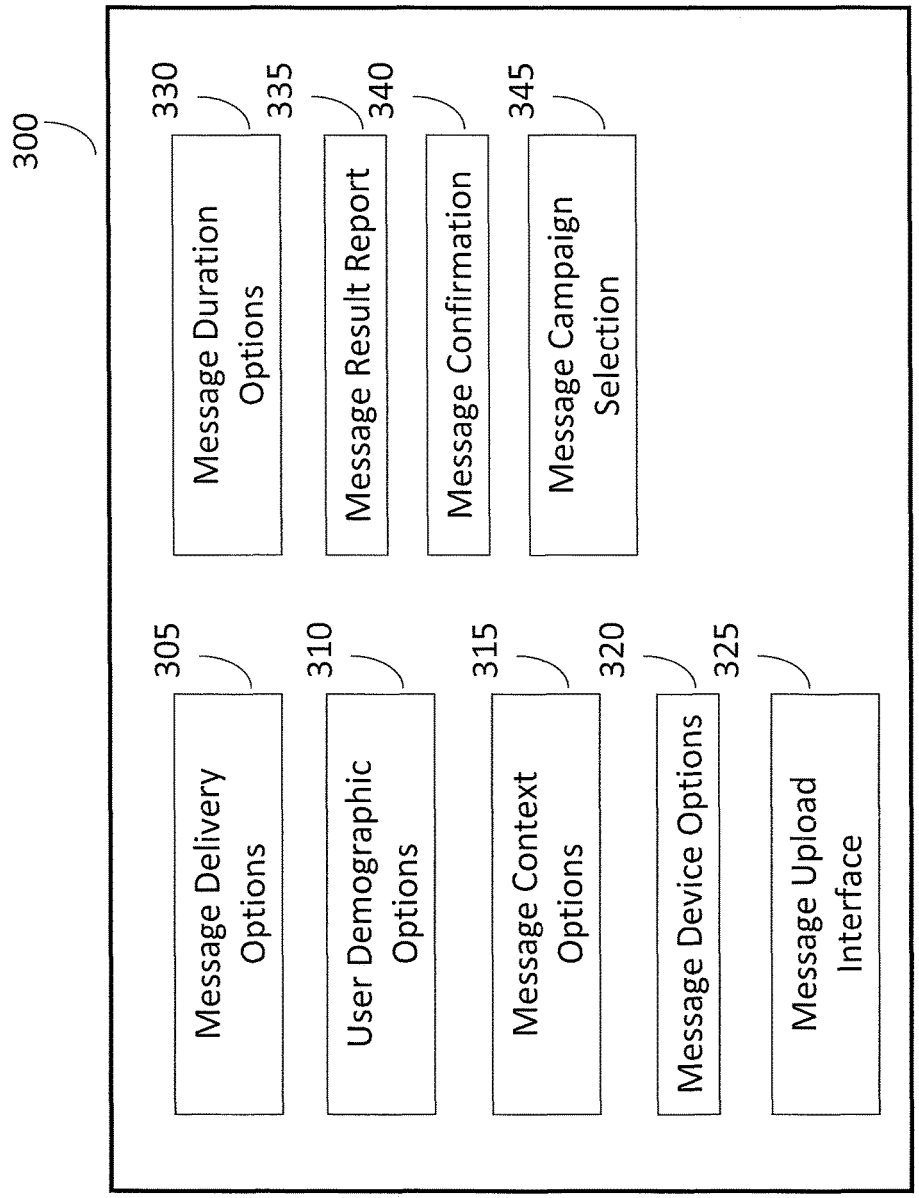
FIG. 3 illustrates a block diagram of an embodiment of the message originator web interface screen usable by the message originator of FIG. 1.

FIG. 3 shows an example message originator web interface screen 300. Not shown are the assumed processing, interface and communication means to support the web interface. The message originator can select a variety of options including how the message can be delivered 305 such as when the delivery mechanism uses terrestrial radio means, the size of the market served by a station and/or the format of the station such as jazz or talk radio, the desired demographic 310 targets of the users 150, special rules for message display based on context 315 such as only displaying the message during certain hours, what devices the message should run on 320 and/or how long the message should run 330. The actual message can be uploaded using the message upload interface 325. Since more than one message campaign can be initiated by a message originator 100, a means to select, initiate and/or cancel a message campaign 345 can be provided. Message campaigns can differ based on the message uploaded and/or any of the options selected. The message result report 335 can provide estimated costs, campaign reach based on the options selected, and/or provide results from campaigns that are ongoing or completed. The message confirmation 340 allows the message originator 100 to select different options, see the potential results and then confirm, and/or save or abandon the campaign.

Figure 4:
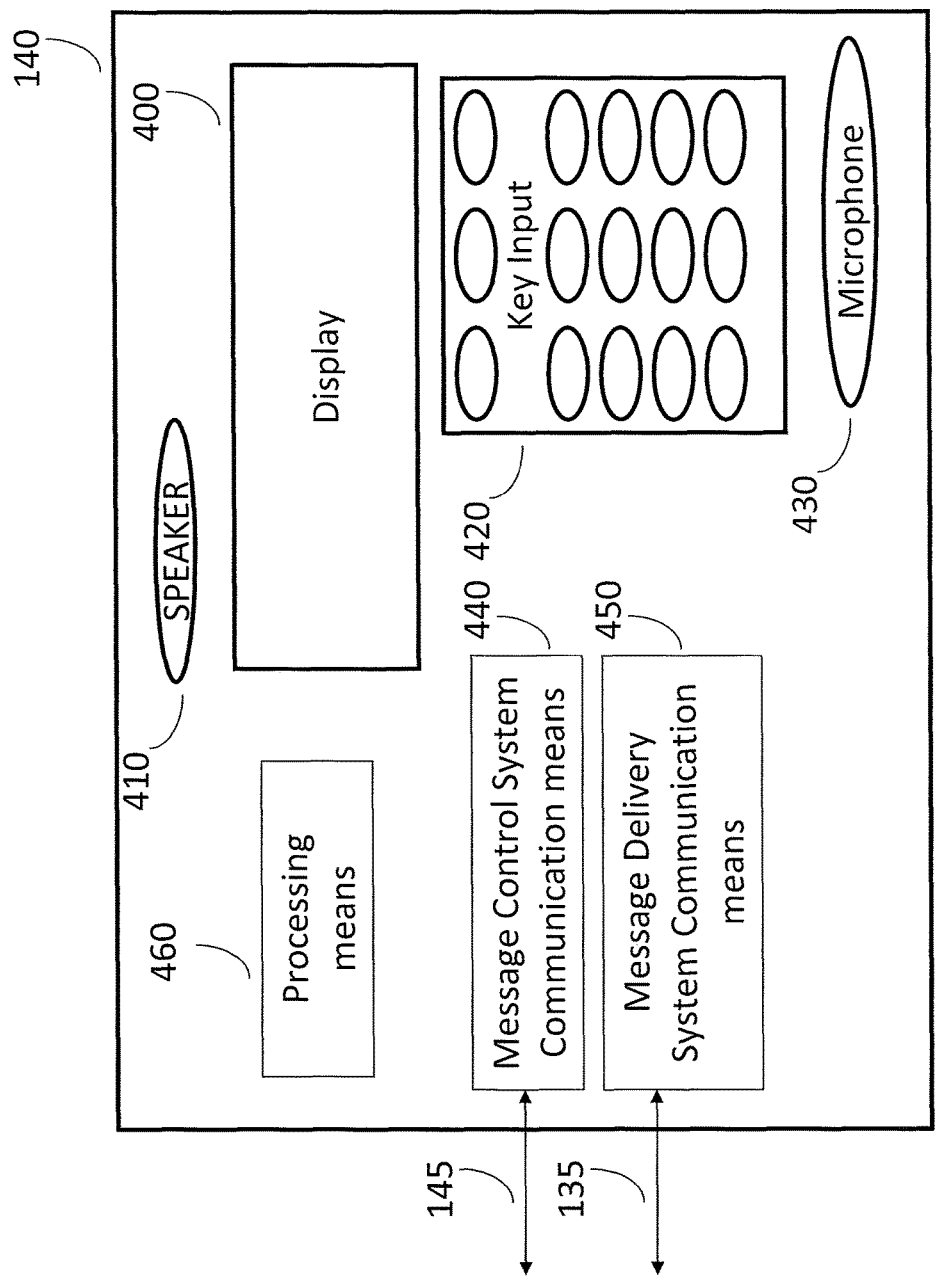
FIG. 4 illustrates a block diagram of an embodiment of the message device of FIG. 1.

FIG. 4 shows an example message device 140. The calendar device communication means comprises at least an input and an output. Shown are communication means 450 and 440 for communicating to the message delivery system 130 using communication link 135 and schedule control system 120 using communication link 145. The communication means 440 and 450 are shown independently, but they may be combined depending on the nature of the communication protocols and/or optionally eliminated for example if there is not a communication link directly to the message control system in the system. The user interface 155 is shown here comprising a display 400, a speaker 410, a key input 420 and microphone 430. The processing means 460 comprises the processor, memory, program code and similar elements to operate the communication means 440, 450 and user interface 155 in addition to providing the timing elements to determine which messages should be displayed when, for how long and when reports should be sent back. The unique identifier associated with the message and any additional information about the message can arrive through communication link 135 and be shown as appropriate on display 400. The user can use the key input 420 and/or the microphone 430 to select the message. The unique identifier associated with the message and the unique identifier associated with the presentation of the message selection can be returned directly or indirectly to the schedule control system 120 through one of the communication means 440, 450. The unique identifier associated with the presentation of the message is generated using the processing means 460.

Computing System

It will be understood by one of ordinary skill in the art that the following embodiments of computing systems, computer clients, servers, computing system devices, and/or the components related thereto can be used in any of the embodiments described herein.

Figure 5:
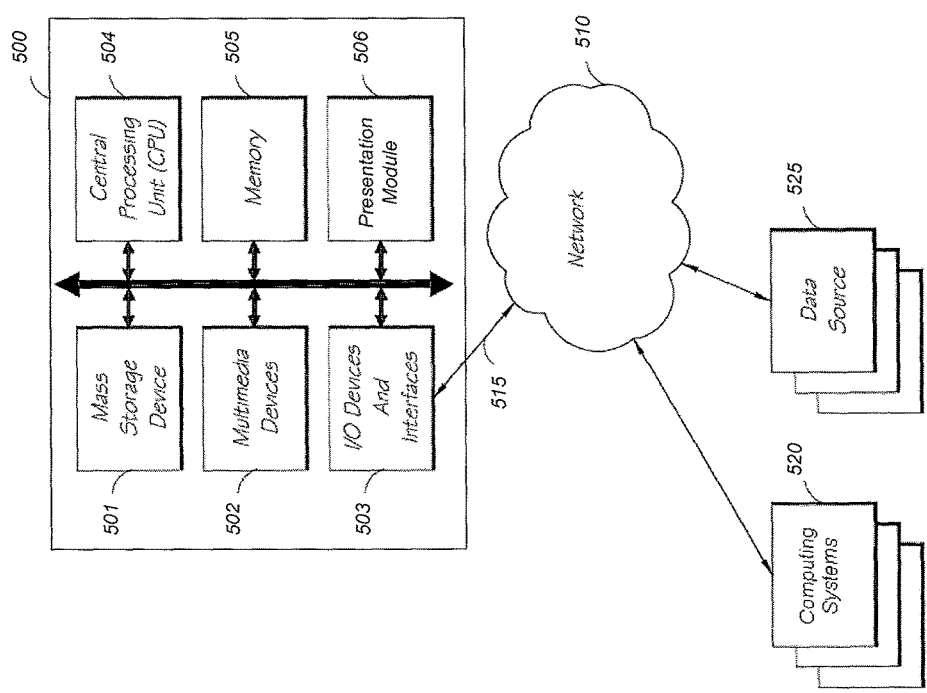
FIG. 5 illustrates a block diagram depicting an embodiment of a computer hardware system configured to run software and/or hardware for the implementation of one or more embodiments of the media asset presentation systems, the message control systems, the message delivery systems, and/or message devices.

In some embodiments, the systems, computer clients and/or servers described above take the form of a computing system 500 shown in FIG. 5, which is a block diagram of one embodiment of a computing system (which can be a fixed system and/or mobile device) that is in communication with one or more computing systems 520 and/or one or more data sources 525 via one or more networks 510. The computing system 500 may be used to implement one or more of the systems and methods described herein. In addition, in one embodiment, the computing system 500 may be configured to process image files. While FIG. 5 illustrates one embodiment of a computing system 500, it is recognized that the functionality provided for in the components and modules of computing system 500 may be combined into fewer components and modules or further separated into additional components and modules.

Client/Server Module

In one embodiment, the system 500 comprises a media element presentation module 506 that carries out the functions, methods, and/or processes described herein. The media element presentation module 506 may be executed on the computing system 500 by a central processing unit 504 discussed further below.

Computing System Components

In one embodiment, the processes, systems, and methods illustrated above may be embodied in part or in whole in software that is running on a computing device. The functionality provided for in the components and modules of the computing device may comprise one or more components and/or modules. For example, the computing device may comprise multiple central processing units (CPUs) and a mass storage device, such as may be implemented in an array of servers.

In general, the word "module," as used herein, refers to logic and/or software embodied in hardware and/or firmware, or embedded in a machine, configured in a special purpose machine, and/or to a collection of software instructions, possibly having entry and exit points, written in a programming language, such as, for example, Java, C, C++, and/or the like. A software module may be compiled and linked into an executable program, installed in a dynamic link library, and/or may be written in an interpreted programming language such as, for example, BASIC, Perl, Lua, and/or Python. It will be appreciated that software modules may be callable from other modules or from themselves, and/or may be invoked in response to detected events and/or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays and/or processors. The modules described herein are preferably implemented as software modules, but may be represented in hardware and/or firmware. Generally, the modules described herein refer to logical modules that may be combined with other modules or divided into sub-modules despite their physical organization or storage.

In one embodiment, the computing system 500 also comprises a mainframe computer suitable for controlling and/or communicating with large databases, performing high volume transaction processing, and generating reports from large databases. The computing system 500 also comprises a central processing unit ("CPU") 504, which may comprise a conventional microprocessor. The computing system 500 further comprises a memory 505, such as random access memory ("RAM") for temporary storage of information and/or a read only memory ("ROM") for permanent storage of information, and a mass storage device 501, such as a hard drive, diskette, and/or optical media storage device. Typically, the modules of the computing system 500 are connected to the computer using a standards based bus system. In different embodiments, the standards based bus system could be Peripheral Component Interconnect (PCI), Microchannel, SCSI, Industrial Standard Architecture (ISA) and Extended ISA (EISA) architectures, for example.

An embodiment of the computing system 500 comprises one or more commonly available input/output (I/O) devices and interfaces 503, such as a keyboard, mouse, touchpad, and printer. In one embodiment, the I/O devices and interfaces 503 comprise one or more display devices, such as a monitor, that allows the visual presentation of data to a user. More particularly, a display device provides for the presentation of GUIs, application software data, and multimedia presentations, for example. In the embodiment of FIG. 5, the I/O devices and interfaces 503 also provide a communications interface to various external devices. The computing system 500 may also comprise one or more multimedia devices 502, such as speakers, video cards, graphics accelerators, and microphones, for example.

Computing System Device/Operating System

The computing system 500 may run on a variety of computing devices, such as, for example, a server, a Windows server, an Structure Query Language server, a Unix server, a personal computer, a mainframe computer, a laptop computer, a cell phone, a personal digital assistant, a kiosk, an audio player, and so forth. The computing system 500 is generally controlled and coordinated by operating system software, such as z/OS, DOS, Windows 95, Windows 98, Windows NT, Windows 2000, Windows XP, Windows Vista, Linux, BSD, SunOS, Solaris, and/or other compatible operating systems. In Macintosh systems, the operating system may be any available operating system, such as MAC OS X. In other embodiments, the computing system 500 may be controlled by a proprietary operating system. Conventional operating systems control and schedule computer processes for execution, perform memory management, provide file system, networking, and I/O services, and provide a user interface, such as a graphical user interface ("GUI"), among other things.

Network

In the embodiment of FIG. 5, the computing system 500 is coupled to a network 510, such as a LAN, WAN, and/or the Internet, for example, via a wired, wireless, or combination of wired and wireless, communication link 515. The network 510 communicates with various computing devices and/or other electronic devices via wired or wireless communication links. In the embodiment of FIG. 5, the network 510 is communicating with one or more computing systems 520 and/or one or more data sources 525.

Access to the media element presentation module 506 of the computer system 500 by computing systems 520 and/or by data sources 525 may be through a web-enabled user access point such as the computing systems' 520 and/or data source's 525 personal computer, cellular phone, laptop, and/or other device capable of connecting to the network 510. Such a device may have a browser module is implemented to use text, graphics, audio, video, and other media to present data and to allow interaction with data via the network 510.

The browser module and/or other output module may be implemented as a combination of an all points addressable display such as a cathode-ray tube (CRT), a liquid crystal display (LCD), a plasma display, and/or other types and/or combinations of displays. In addition, the browser module and/or other output module may be implemented to communicate with input devices 503 and may also comprise software with the appropriate interfaces which allow a user to access data through the use of stylized screen elements such as, for example, menus, windows, dialog boxes, toolbars, and controls (for example, radio buttons, check boxes, sliding scales, and so forth). Furthermore, the browser module and/or other output module may communicate with a set of input and output devices to receive signals from the user.

The input device(s) may comprise a keyboard, roller ball, pen and stylus, mouse, trackball, voice recognition system, and/or pre-designated switches and/or buttons. The output device(s) may comprise a speaker, a display screen, a printer, and/or a voice synthesizer. In addition a touch screen may act as a hybrid input/output device. In another embodiment, a user may interact with the system more directly such as through a system terminal connected to the score generator without communications over the Internet, a WAN, and/or LAN, and/or similar network.

In some embodiments, the computer system 500 may comprise a physical and/or logical connection established between a remote microprocessor and a mainframe host computer for the express purpose of uploading, downloading, and/or viewing interactive data and databases on-line in real time. The remote microprocessor may be operated by an entity operating the computer system 500, including the client server systems and/or the main server system, an/or may be operated by one or more of the data sources 525 and/or one or more of the computing systems. In some embodiments, terminal emulation software may be used on the microprocessor for participating in the micro-mainframe link.

In some embodiments, computing systems 520 who are internal to an entity operating the computer system 500 may access the media element presentation module 506 internally as an application and/or process run by the CPU 504.

User Access Point

In one embodiment, a user access point comprises a personal computer, a laptop computer, a cellular phone, a digital media device such as an iPod or Zune, a GPS system, a Blackberry® device, a portable computing device, a server, a computer workstation, a local area network of individual computers, an interactive kiosk, a personal digital assistant, an interactive wireless communications device, a handheld computer, an embedded computing device, and/or the like.

Other Systems

In addition to the systems that are illustrated in FIG. 5, the network 510 may communicate with other data sources and/or other computing devices. The computing system 500 may also comprise one or more internal and/or external data sources. In some embodiments, one or more of the data repositories and the data sources may be implemented using a relational database, such as DB2, Sybase, Oracle, Code-Base and Microsoft® SQL Server, mySQL, as well as other types of databases such as, for example, a flat file database, an entity-relationship database, and object-oriented database, and/or a record-based database.

In some embodiments, the acts, methods, and processes described herein are implemented within, and/or using, software modules (programs) that are executed by one or more general purpose computers. The software modules may be stored on or within any suitable computer-readable medium. It should be understood that the various steps may alternatively be implemented in-whole or in-part within specially designed hardware. The skilled artisan will recognize that not all calculations, analyses and/or optimization require the use of computers, though any of the above-described methods, calculations and/or analyses can be facilitated through the use of computers.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Additionally, the skilled artisan will recognize that any of the above-described methods can be carried out using any appropriate apparatus. Further, the disclosure herein of any particular feature in connection with an embodiment can be used in all other disclosed embodiments set forth herein. Thus, it is intended that the scope of the present invention herein disclosed should not be limited by the particular disclosed embodiments described above.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Various inventive methods and apparatuses have been described in this document. Various combinations of these methods and apparatuses (as well as others) may be implemented in a given system, and not all are required to practice the present invention. Further, the methods and system may be implemented differently than described herein without departing from the true spirit and scope of the invention. Thus, nothing in this document is intended to suggest that any particular feature, method, or step is a requirement of the invention.

All or some of the methods and processes described above may be embodied in, and fully automated via, software code modules executed by one or more general purpose computers. The code modules may be stored in any type of computer-readable medium or other computer storage device. Some or all of the methods may alternatively be embodied in specialized computer hardware.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Additionally, the skilled artisan will recognize that any of the above-described methods can be carried out using any appropriate apparatus. Further, the disclosure herein of any particular feature in connection with an embodiment can be used in all other disclosed embodiments set forth herein. Thus, it is intended that the scope of the present invention herein disclosed should not be limited by the particular disclosed embodiments described above.

What is claimed is:

1. A media system for determining a message element corollary to a selected broadcast segment content for electronic communication to a computing device for presentation prior to beginning a primary functional operation of the computing device, during a transition between a first operational state and a second operational state of the computing device, the media system comprising:

one or more computer readable storage devices configured to store a plurality of computer executable instructions; and one or more hardware computer processors in communication with the one or more computer readable storage devices and configured to execute the plurality of computer executable instructions in order to cause the system to:

identify, from a plurality of broadcast segments received, the selected broadcast segment content for association with the message element;

determine a successful completion of electronic communication to the computing device of the message element and the selected broadcast segment content;

determine a presentation criteria through analysis of the message element and the selected broadcast segment content, wherein the presentation criteria is related to at least one characteristic of the selected broadcast segment content, wherein the presentation criteria enables presentation of the message element to be triggered by and to occur during the transition between the first operational state and the second operational state of the computing device, prior to beginning the primary functional operation of the computing device, and wherein the second operational state comprises an operational state of the computing device that performs the primary functional operation of the computing device and provides access by the computing device to the selected broadcast segment content, and wherein the first operational state comprises an operational state of the computing device that does not perform the primary functional operation of the computing device and does not provide access by the computing device to the selected broadcast segment content;

determine, based at least partially on the presentation criteria, a message addendum for combination with the message element, whereby the presentation criteria enables presentation of the message addendum with or in place of the message element to be triggered by and to occur during the transition between the first operational state and the second operation state of the computing device, prior to beginning the primary functional operation of the computing device; and determine that at least the message addendum or the message element has been presented using the computing device during the transition between the first operational state and the second operation state of the computing device, prior to beginning the primary functional operation of the computing device.

2. The media system of claim 1, wherein the message element is electronically communicated to the computing device using at least one of the following: installment during manufacture, installment prior to delivery to a user, a download while the computing device is docked, data delivered in association with a broadcast, delivery by a computer network, delivery through a wireless communication, delivery by removable non-transitory memory, delivery by a wired communication, delivery by satellite.

3. The media system of claim 1, wherein the presentation criteria is determined based upon a characteristic of at least one of the following: the computing device activity, information from a database, the message addendum, a manufacturer of the computing device, an advertiser, message size, a geographic location, user input, demographic information.

4. The media system of claim 1, wherein the determination of the message addendum uses at least one of the following: information about the selected broadcast segment content, information about the computing device, demographic data associated with at least one user of the computing device, history of the computing device, history of at least one user of the computing device, information about the message addendum, information about the message element, a period of time from when the message element was electronically communicated to the computing device.

5. The media system of claim 1, wherein the message element is determined using at least one of the following: a report obtained from the computing device, a prior electronic communication with the computing device, a database entry, analysis of past messaging results, a report obtained from a third party.

6. The media system of claim 1, wherein the one or more hardware computer processors are further configured to execute the plurality of computer executable instructions in order to cause the system to:

receive information from the computing device, the information including at least one of the following: a number of presentations, message frequency, message delivery location, usage patterns, user preferences, peer to peer message forwarding, message element receipt, computing device identifier.

7. A computer-implemented method for determining a message element corollary to a selected broadcast segment content for electronic communication to a computing device for presentation prior to beginning a primary functional operation of the computing device, during a transition between a first operational state and a second operational state of the computing device, the computer-implemented method comprising:

identifying, by a computer system, from a plurality of broadcast segments received, the selected broadcast segment content for association with the message element;

determining, by the computer system, a successful completion of electronic communication to the computing device of the message element and the selected broadcast segment content;

determining, by the computer system, a presentation criteria through analysis of the message element and the selected broadcast segment content, wherein the presentation criteria is related to at least one characteristic of the selected broadcast segment content, wherein the presentation criteria enables presentation of the message element to be triggered by and to occur during the transition between the first operational state and the second operational state of the computing device, prior to beginning the primary functional operation of the computing device, and wherein the second operational state comprises an operational state of the computing device that performs the primary functional operation of the computing device and provides access by the computing device to the selected broadcast segment content, and wherein the first operational state comprises an operational state of the computing device that does not perform the primary functional operation of the computing device and does not provide access by the computing device to the selected broadcast segment content;

determining, by the computer system, based at least partially on the presentation criteria, a message addendum for combination with the message element, whereby the presentation criteria enables presentation of the message addendum with or in place of the message element to be triggered by and to occur during the transition between the first operational state and the second operation state of the computing device, prior to beginning the primary functional operation of the computing device; and determining, by the computer system, that at least the message addendum or the message element has been presented using the computing device during the transition between the first operational state and the second operation state of the computing device, prior to beginning the primary functional operation of the computing device;

wherein the computer system comprises at least one computer processor and at least one electronic memory.

8. The computer-implemented method of claim 7, wherein the message element is electronically communicated to the computing device using at least one of the following: installment during manufacture, installment prior to delivery to a user, a download while the computing device is docked, data delivered in association with a broadcast, delivery by a computer network, delivery through a wireless communication, delivery by removable non-transitory memory, delivery by a wired communication, delivery by satellite.

9. The computer-implemented method of claim 7, wherein the presentation criteria is determined based upon a characteristic of at least one of the following: the computing device activity, information in a database, the message addendum, a manufacturer of the computing device, an advertiser, message size, a geographic location, user input, demographic information.

10. The computer-implemented method of claim 7, wherein the determination of the message addendum uses at least one of the following: information about the selected broadcast segment content, information about the computing device, demographic data associated with at least one user of the computing device, history of the computing device, history of at least one user of the computing device, information about the message addendum, information about the message element, a period of time from when the message element was electronically communicated to the computing device.

11. The computer-implemented method of claim 7, wherein the message element is determined using at least one of the following: a report obtained from the computing device, a prior electronic communication with the computing device, a database entry, analysis of past messaging results, a report obtained from a third party.

12. The computer-implemented method of claim 7, further comprising:
receiving information from the computing device, the information including at least one of the following: a number of presentations, message frequency, message delivery location, usage patterns, user preferences, peer to peer message forwarding, message element receipt, computing device identifier.

13. The computer-implemented method of claim 7, wherein the computer system further comprises multiple computers linked using a computer network enabling electronic communication.

14. Non-transitory computer storage having stored thereon instructions that when executed, direct a computer system to perform a method for determining a message element corollary to a selected broadcast segment content for electronic communication to a computing device for presentation prior to beginning a primary functional operation of the computing device, during a transition between a first operational state and a second operational state of the computing device, the method comprising:
identifying, by the computer system, from a plurality of broadcast segments received, the selected broadcast segment content for association with the message element;
determining, by the computer system, a successful completion of electronic communication to the computing device of the message element and the selected broadcast segment content;
determining, by the computer system, a presentation criteria through analysis of the message element and the selected broadcast segment content, wherein the presentation criteria is related to at least one characteristic of the selected broadcast segment content,
wherein the presentation criteria enables presentation of the message element to be triggered by and to occur during the transition between the first operational state and the second operational state of the computing device, prior to beginning the primary functional operation of the computing device, and
wherein the second operational state comprises an operational state of the computing device that performs the primary functional operation of the computing device and provides access by the computing device to the selected broadcast segment content, and wherein the first operational state comprises an operational state of the computing device that does not perform the primary functional operation of the computing device and does not provide access by the computing device to the selected broadcast segment content;
determining, by the computer system, based at least partially on the presentation criteria, a message addendum for combination with the message element, whereby the presentation criteria enables presentation of the message addendum with or in place of the message element to be triggered by and to occur during the transition between the first operational state and the second operation state of the computing device, prior to beginning the primary functional operation of the computing device; and
determining, by the computer system, that at least the message addendum or the message element has been presented using the computing device during the transition between the first operational state and the second operation state of the computing device, prior to beginning the primary functional operation of the computing device;
wherein the computer system comprises at least one computer processor and at least one electronic memory.

15. The non-transitory computer storage of claim 14, wherein the message element is electronically communicated to the computing device using at least one of the following: installment during manufacture, installment prior to delivery to a user, a download while the computing device is docked, data delivered in association with a broadcast, delivery by a computer network, delivery through a wireless communication, delivery by removable non-transitory memory, delivery by a wired communication, delivery by satellite.

16. The non-transitory computer storage of claim 14, wherein the presentation criteria is determined based on the characteristics of at least one of the following: the computing device activity, information in a database, the message addendum, a manufacturer of the computing device, an advertiser, message size, a geographic location, user input, demographic information.

17. The non-transitory computer storage of claim 14, wherein the determination of the message addendum uses at least one of the following additional criteria: information about the selected broadcast segment content, information about the computing device, demographic data associated with at least one user of the computing device, history of the computing device, history of at least one user of the computing device, information about the message addendum, information about the message element, a period of time from when the message element was electronically communicated to the computing device.

18. The non-transitory computer storage of claim 14, wherein the message element is determined using at least one of the following: a report obtained from the computing device, a prior electronic communication with the computing device, a database entry, analysis of past messaging results, a report obtained from a third party.

19. The non-transitory computer storage of claim 14, wherein the method further comprises:
receiving information from the computing device, the information including at least one of the following: a number of presentations, message frequency, message delivery location, usage patterns, user preferences, peer to peer message forwarding, message element receipt, computing device identifier.

20. The non-transitory computer storage of claim 14, wherein the computer system further comprises multiple computers linked using a computer network enabling electronic communication.

* * * * *

UNITED STATES PATENT AND TRADEMARK OFFICE
CERTIFICATE OF CORRECTION

PATENT NO. : 10,491,680 B2  
APPLICATION NO. : 14/138524  
DATED : November 26, 2019  
INVENTOR(S) : Kelly M. Christensen, John Phillip Hansen and Thomas Daniel Mock Page 1 of 1

It is certified that error appears in the above-identified patent and that said Letters Patent is hereby corrected as shown below:

In the Specification

In Column 1, Line 49, delete "the a" and insert --the--.

In Column 12, Line 54, delete "TCPIP" and insert --TCP/IP--.

In Column 20, Line 51, delete "an/or" and insert --and/or--.

In the Claims

In Column 23, Line 3, Claim 1, delete "operation" and insert --operational--.

In Column 23, Line 9, Claim 1, delete "operation" and insert --operational--.

In Column 24, Line 31, Claim 7, delete "operation" and insert --operational--.

In Column 24, Line 38, Claim 7, delete "operation" and insert --operational--.

In Column 26, Line 4, Claim 14, delete "operation" and insert --operational--.

In Column 26, Line 11, Claim 14, delete "operation" and insert --operational--.

Signed and Sealed this  
Third Day of March, 2020

Andrei Iancu  
*Director of the United States Patent and Trademark Office*